(12) United States Patent
Wong et al.

(10) Patent No.: US 8,907,867 B2
(45) Date of Patent: Dec. 9, 2014

(54) DON AND DOFF SENSING USING CAPACITIVE SENSORS

(75) Inventors: Adrian Wong, Mountain View, CA (US); Joseph John Hebenstreit, San Francisco, CA (US); Russell Norman Mirov, Los Altos, CA (US)

(73) Assignee: Google Inc., Mountain View, CA (US)

( * ) Notice: Subject to any disclaimer, the term of this patent is extended or adjusted under 35 U.S.C. 154(b) by 255 days.

(21) Appl. No.: 13/426,398

(22) Filed: Mar. 21, 2012

(65) Prior Publication Data

US 2013/0249849 A1 Sep. 26, 2013

(51) Int. Cl.
G09G 5/00 (2006.01)

(52) U.S. Cl.
USPC ...... 345/8; 345/7; 379/430; 381/14; 381/370; 348/53; 349/11

(58) Field of Classification Search
CPC ........... H04M 1/6066; H04M 2250/12; H04R 1/1041; H04R 1/10; H04R 2420/07
USPC ....... 345/7, 8; 379/430; 381/74, 370; 348/53; 349/11
See application file for complete search history.

(56) References Cited

U.S. PATENT DOCUMENTS

| | | | |
|---|---|---|---|
| 5,138,555 A | 8/1992 | Albrecht | |
| 5,506,730 A | 4/1996 | Morley | |
| 5,635,948 A * | 6/1997 | Tonosaki | 345/8 |
| 7,010,332 B1 * | 3/2006 | Irvin et al. | 455/575.2 |
| 7,123,215 B2 * | 10/2006 | Nakada | 345/8 |
| 7,255,437 B2 | 8/2007 | Howell et al. | |
| 7,289,102 B2 * | 10/2007 | Hinckley et al. | 345/156 |
| 7,315,254 B2 | 1/2008 | Smith | |
| 7,401,918 B2 | 7/2008 | Howell et al. | |
| 7,481,531 B2 | 1/2009 | Howell et al. | |
| 7,500,746 B1 | 3/2009 | Howell et al. | |

(Continued)

FOREIGN PATENT DOCUMENTS

| | | |
|---|---|---|
| JP | 62157007 | 7/1987 |
| JP | 2005-70308 | 3/2005 |
| JP | 2005-72867 | 3/2005 |

OTHER PUBLICATIONS

Salvucci et al., "The time course of a lane change: Driver control and eye-movement behavior," Transportation Research Part F, pp. 123-132 (Mar. 2002).

(Continued)

Primary Examiner — Lun-Yi Lao
Assistant Examiner — Peter D Mcloone
(74) Attorney, Agent, or Firm — McDonnell Boehnen Hulbert & Berghoff LLP

(57) ABSTRACT

Methods and devices for determining whether a head-mountable computing device is donned or doffed are disclosed. In one embodiment, a method is disclosed that includes receiving from at least one capacitive sensor data indicating a rate of change of capacitance, making a comparison of the rate of change of capacitance to a threshold rate of change of capacitance and, based on the comparison, determining whether the head-mountable computing device is donned or doffed. The method further includes, if the head-mountable computing device is donned, causing the head-mountable computing device to operate in a first state, and if the head-mountable computing device is doffed, causing the head-mountable computing device to operate in a second state, where the head-mountable computing device consumes less power in the second state than in the first state.

19 Claims, 8 Drawing Sheets

(56) References Cited

U.S. PATENT DOCUMENTS

| | | | |
|---|---|---|---|
| 7,542,012 B2* | 6/2009 | Kato et al. | 345/8 |
| 7,581,833 B2 | 9/2009 | Howell et al. | |
| 7,593,757 B2 | 9/2009 | Yamasaki | |
| 7,614,001 B2 | 11/2009 | Abbott et al. | |
| 7,677,723 B2 | 3/2010 | Howell | |
| 7,771,046 B2 | 8/2010 | Howell et al. | |
| 7,806,525 B2 | 10/2010 | Howell et al. | |
| 7,877,686 B2 | 1/2011 | Abbott et al. | |
| 7,922,321 B2 | 4/2011 | Howell et al. | |
| 7,945,297 B2 | 5/2011 | Philipp | |
| 7,987,070 B2* | 7/2011 | Kahn et al. | 702/160 |
| 8,045,727 B2* | 10/2011 | Philipp | 381/74 |
| 8,109,629 B2 | 2/2012 | Howell et al. | |
| 8,115,739 B2* | 2/2012 | Park et al. | 345/173 |
| 8,184,067 B1* | 5/2012 | Braun et al. | 345/7 |
| 8,203,502 B1* | 6/2012 | Chi et al. | 345/7 |
| 8,212,662 B2 | 7/2012 | Sasaki et al. | |
| 8,335,312 B2* | 12/2012 | Gerhardt et al. | 379/430 |
| 8,384,617 B2* | 2/2013 | Braun et al. | 345/7 |
| 8,428,053 B2* | 4/2013 | Kannappan | 370/356 |
| 8,430,507 B2* | 4/2013 | Howell et al. | 351/158 |
| 8,538,009 B2* | 9/2013 | Gerhardt et al. | 379/430 |
| 8,559,621 B2* | 10/2013 | Gerhardt et al. | 379/430 |
| 8,686,924 B2* | 4/2014 | Braun et al. | 345/8 |
| 2002/0021278 A1* | 2/2002 | Hinckley et al. | 345/156 |
| 2004/0104864 A1* | 6/2004 | Nakada | 345/8 |
| 2005/0137755 A1 | 6/2005 | Chase et al. | |
| 2006/0045304 A1* | 3/2006 | Lee et al. | 381/384 |
| 2006/0119539 A1* | 6/2006 | Kato et al. | 345/8 |
| 2007/0076897 A1* | 4/2007 | Philipp | 381/74 |
| 2007/0106172 A1 | 5/2007 | Abreu | |
| 2007/0121959 A1* | 5/2007 | Philipp | 381/74 |
| 2007/0273665 A1* | 11/2007 | Park et al. | 345/173 |
| 2007/0281762 A1 | 12/2007 | Barros et al. | |
| 2008/0068559 A1 | 3/2008 | Howell | |
| 2008/0080705 A1 | 4/2008 | Gerhardt et al. | |
| 2008/0112567 A1* | 5/2008 | Siegel et al. | 381/58 |
| 2008/0130910 A1* | 6/2008 | Jobling et al. | 381/74 |
| 2008/0239080 A1 | 10/2008 | Moscato | |
| 2009/0055739 A1* | 2/2009 | Murillo et al. | 715/708 |
| 2009/0234614 A1* | 9/2009 | Kahn et al. | 702/141 |
| 2010/0020998 A1* | 1/2010 | Brown et al. | 381/380 |
| 2010/0066832 A1 | 3/2010 | Nagahara et al. | |
| 2010/0079356 A1 | 4/2010 | Hoellwarth | |
| 2010/0149073 A1 | 6/2010 | Chaum | |
| 2010/0157430 A1 | 6/2010 | Hotta et al. | |
| 2010/0164702 A1 | 7/2010 | Sasaki et al. | |
| 2010/0202626 A1* | 8/2010 | Shiori et al. | 381/74 |
| 2010/0215170 A1* | 8/2010 | Kannappan | 379/418 |
| 2010/0295769 A1 | 11/2010 | Lundstrom | |
| 2011/0077056 A1 | 3/2011 | Park et al. | |
| 2011/0080289 A1* | 4/2011 | Minton | 340/573.1 |
| 2011/0121976 A1 | 5/2011 | Johns et al. | |
| 2011/0125756 A1 | 5/2011 | Spence et al. | |
| 2011/0187844 A1 | 8/2011 | Ogawa et al. | |
| 2011/0231757 A1 | 9/2011 | Haddick | |
| 2011/0267321 A1 | 11/2011 | Hayakawa | |
| 2012/0050138 A1 | 3/2012 | Sato et al. | |
| 2012/0050668 A1* | 3/2012 | Howell et al. | 351/158 |
| 2012/0196540 A1* | 8/2012 | Pearce | 455/41.3 |
| 2013/0021225 A1* | 1/2013 | Braun et al. | 345/8 |
| 2013/0022214 A1* | 1/2013 | Dickins et al. | 381/74 |
| 2013/0069985 A1* | 3/2013 | Wong et al. | 345/633 |
| 2013/0095894 A1* | 4/2013 | Gerhardt et al. | 455/569.1 |
| 2013/0154906 A1* | 6/2013 | Braun et al. | 345/8 |
| 2013/0210497 A1* | 8/2013 | Gerhardt et al. | 455/569.1 |
| 2013/0278552 A1* | 10/2013 | Kamin-Lyndgaard | 345/174 |
| 2013/0335301 A1 | 12/2013 | Wong et al. | |

OTHER PUBLICATIONS

Pentland et al., "Modeling and Prediction of Human Behavior," Neural Computation (Massachusetts Institute of Technology) vol. 11, pp. 229-242 (Nov. 1999).

* cited by examiner

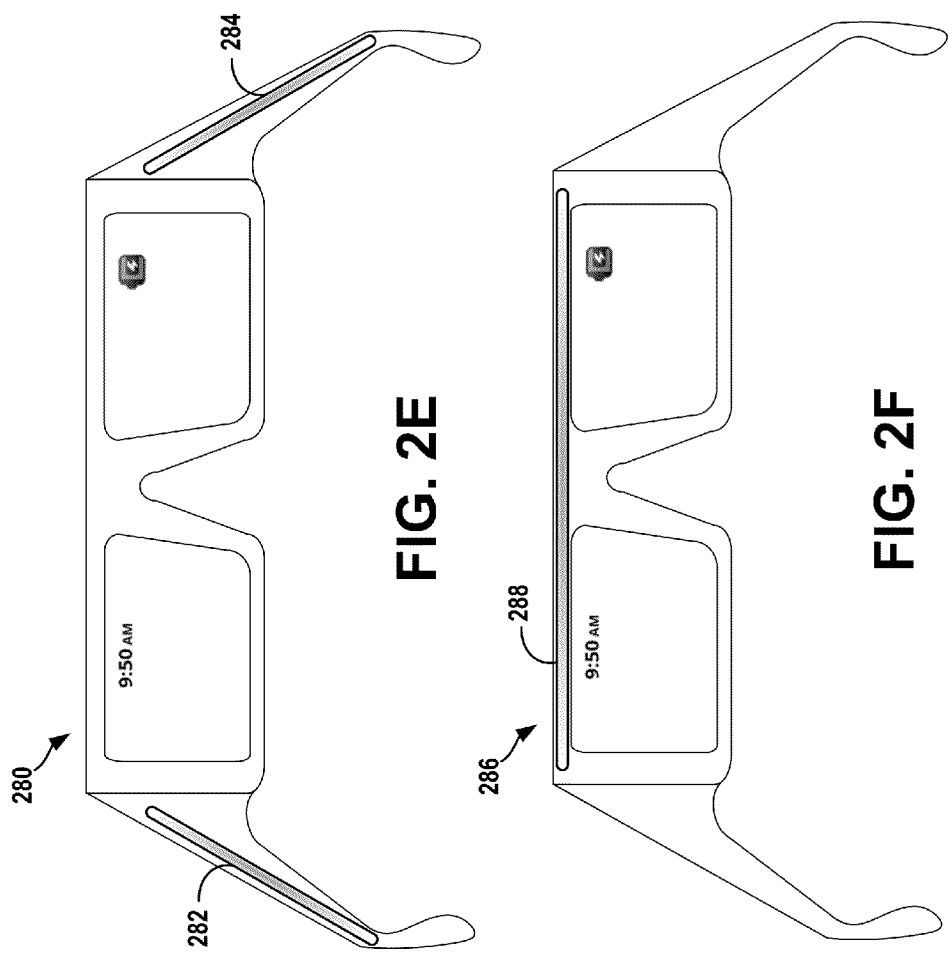

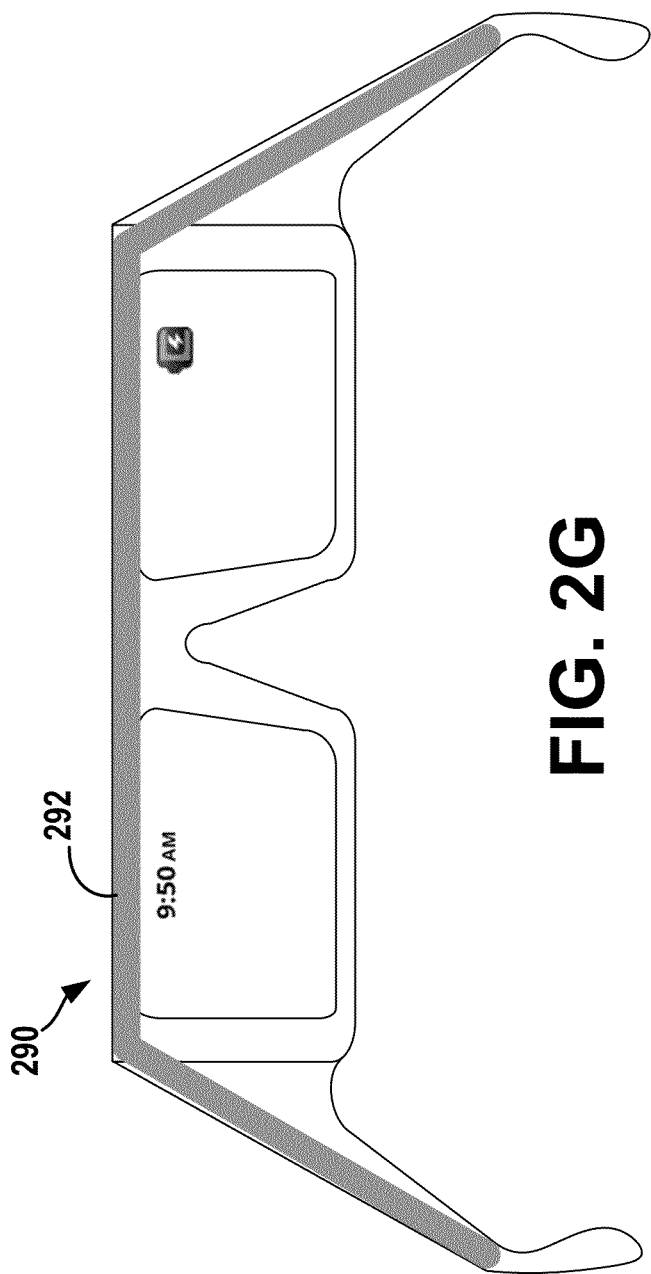

DON AND DOFF SENSING USING CAPACITIVE SENSORS

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, location and context-aware computing devices may be worn by a user as they go about various aspects of their everyday life. Such computing devices, which are commonly referred to as "head-mountable" computing devices, are configured to sense and analyze a user's environment and to provide information intelligently, as appropriate to the physical world being experienced by the user.

SUMMARY

In one aspect, an example method is disclosed that includes receiving from at least one capacitive sensor data indicating a rate of change of capacitance, making a comparison of the rate of change of capacitance and a threshold rate of change of capacitance and, based on the comparison, determining whether a head-mountable computing device is donned or doffed. The method further includes, if the head-mountable computing device is donned, causing the head-mountable computing device to operate in a first state, and, if the head-mountable computing device is doffed, causing the head-mountable computing device to operate in a second state, where the head-mountable computing device consumes less power in the second state than in the first state.

In yet another aspect, a non-transitory computer-readable medium is disclosed having stored therein instructions executable by a computing device to cause the computing device to perform the example method described above.

In still another aspect, a head-mountable computing device is disclosed that includes at least one capacitive sensor, at least one processor, and data storage. The data storage includes instructions executable by the at least one processor to receive from the at least one capacitive sensor data indicating a rate of change of capacitance, making a comparison of the rate of change of capacitance and a threshold rate of change of capacitance and, based on the comparison, determine whether the head-mountable computing device is donned or doffed. The instructions are further executable by the at least one processor to, if the head-mountable computing device is donned, cause the head-mountable computing device to operate in a first state and, if the head-mountable computing device is doffed, cause the head-mountable computing device to operate in a second state, where the head-mountable computing device consumes less power in the second state than in the first state.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 2A-G illustrate head-mountable computing devices, in accordance with example embodiments.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview

A head-mountable computing device may be configured to execute any number of functions, such as displaying information on a display of the head-mountable computing device, communicating with one or more other devices, emitting audio, visual, and/or haptic notifications, receiving inputs, and sensing an environment around the head-mountable computing device. In performing these functions, the head-mountable computing device may consume battery power supplied by one or more batteries in the head-mountable computing device.

In order to conserve power on the head-mountable computing device and, in turn, improve the battery life of the head-mountable computing device, it may be desirable for the head-mountable computing device to occasionally switch from a first state to a second state in which the head-mountable computing device consumes less power than in the first state.

To this end, the head-mountable computing device may include one or more capacitive sensors. Each capacitive sensor may be configured to sense a capacitance between the capacitive sensor and a surrounding medium, such as air and/or a nearby conductor, such as a head of a user. Based on capacitances sensed over a period of time, the head-mountable computing device may determine a rate of change of capacitance. The head-mountable computing device may make a comparison of the rate of change of capacitance and a threshold rate of change of capacitance and, based on the comparison, may determine whether the head-mountable computing device is donned (e.g., being worn) by a user or doffed (e.g., not being worn) by a user. If the head-mountable computing device is donned, the head-mountable computing device may operate in the first state. If, on the other hand, the head-mountable computing device is doffed, the head-mountable computing device may operate in the second state. As a result, when the head-mountable computing device is doffed, the head-mountable computing device may consume less power than when the head-mountable computing device is donned.

An example method is described below in connection with FIG. 1, and a number of example head-mountable computing devices are described below in connection with FIGS. 2A-G and 3. Example use scenarios of a head-mountable computing device is described below in connection with FIGS. 4A-C.

2. Example Method

Figure 1:
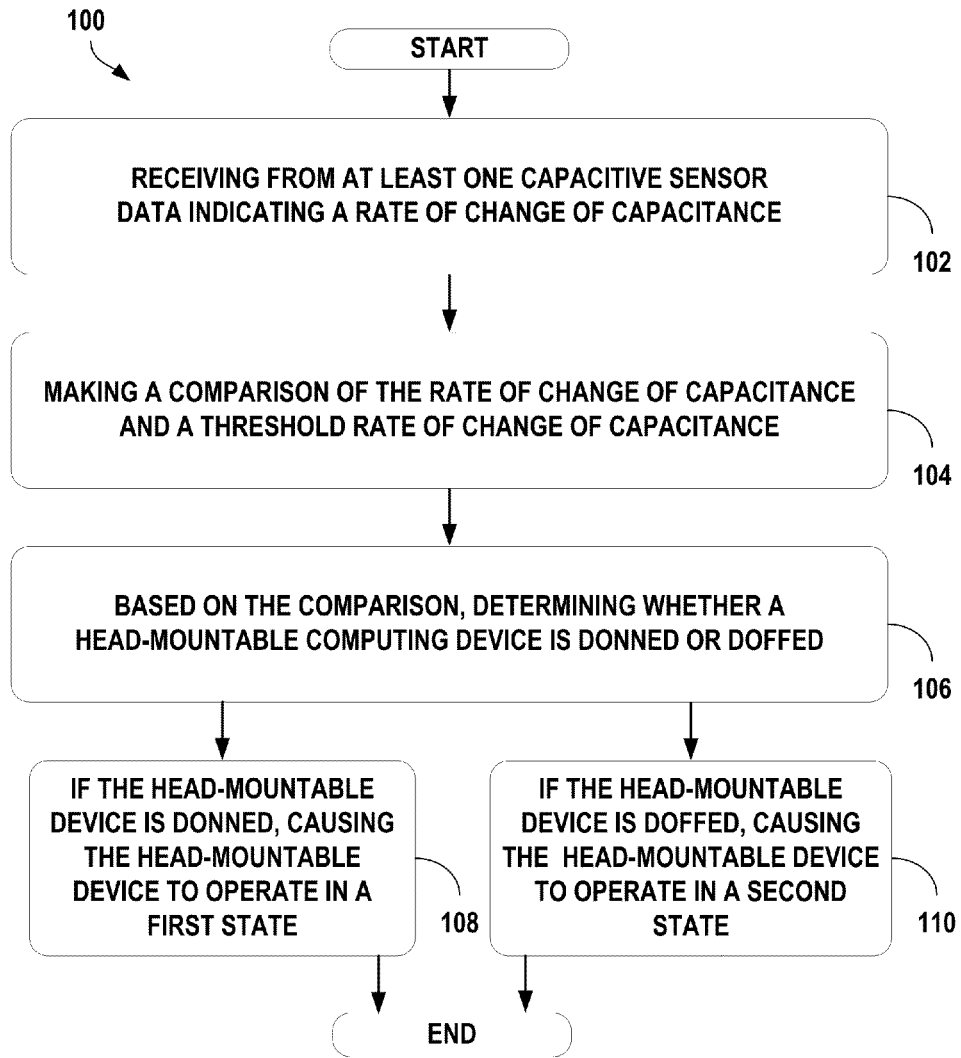
FIG. 1 is a flow chart illustrating a method, in accordance with an example embodiment.

FIG. 1 is a flow chart illustrating a method 100, in accordance with an example embodiment. Method 100 shown in FIG. 1 could be used with any of the head-mountable computing devices described herein or with head-mountable computing devices that are differently configured. Method 100 may include one or more operations, functions, or actions as illustrated by one or more of blocks 102-110. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that store data for short periods of time, including register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is wired to perform the specific logical functions in the process.

As shown, the method 100 begins at block 102 where a head-mountable computing device receives from at least one capacitive sensor data indicating a rate of change of capacitance. For example, the head-mountable computing device may periodically receive data indicating values of sensed capacitances. The data may, for example, indicate a value of the sensed capacitance (e.g., in farads). Alternatively, the data may indicate a value (e.g., in volts), that represents a value of the sensed capacitance. The data may take other forms as well. The head-mountable computing device may determine the rate of change of the capacitance using the values of the sensed capacitances and a period of time between when the sensed capacitances were received. For example, if data indicating a first capacitance is received, and data indicating a second capacitance is received a period of time later, then the rate of change of capacitance may be determined to be a difference between the first capacitance and the second capacitance divided by the period of time. The head-mountable computing device may additionally determine whether the capacitance is increasing or decreasing from the first capacitance to the second capacitance. Other examples are possible as well.

At block 104, the head-mountable computing device makes a comparison of the rate of change of capacitance and threshold rate of change of capacitance. The threshold rate of change of capacitance may take a number of forms. For example, the threshold rate of change may be greater than a typical rate of change of capacitance due to environmental changes (e.g., changes in humidity). As another example, the threshold rate of change may be approximately equal to a measured rate of change of capacitance while a user moves the head-mountable computing device from being donned to being doffed, or vice versa, as determined, e.g., during calibration and/or use of the head-mountable computing device. The threshold rate of change of capacitance may take other forms as well.

The comparison of the rate of change of capacitance and the threshold rate of change of capacitance may involve, for example, determining whether the rate of change of capacitance is greater than or equal to (e.g., in magnitude) the threshold rate of change of capacitance. The comparison may take other forms as well.

The method 100 continues at block 106 where, based on the comparison, the head-mountable computing device determines whether the head-mountable computing device is donned or doffed. The head-mountable computing device may be said to be donned when the head-mountable computing device is proximate to a head of a user. Similarly, the head-mountable computing device may be said to be doffed when the head-mountable computing device is not proximate to a head of a user.

The proximity of the head-mountable computing device to a head of a user may be determined based on the comparison. For example, in embodiments where the threshold rate of change of capacitance is greater than a typical rate of change of capacitance due to environmental changes, and the comparison indicates that the rate of change of capacitance is greater than the threshold rate of change of capacitance, the head-mountable computing device may determine that the head-mountable computing device has gone from being donned to being doffed, or vice versa. If the rate of change is positive, indicating an increase in capacitance over time, the head-mountable computing device may determine that the head-mountable computing device has been donned. If, on the other hand, the rate of change is negative, indicating a decrease in capacitance over time, the head-mountable computing device may determine that the head-mountable computing device has been doffed. Other examples are possible as well.

If the head-mountable computing device is donned, the method 100 continues at block 108 where the head-mountable computing device causes the head-mountable computing device to operate in a first state. If, on the other hand, the head-mountable computing device is doffed, the method 100 continues at block 110 where the head-mountable computing device causes the head-mountable computing device to operate in a second state.

The head-mountable computing device may consume less power in the second state than in the first state. For example, a display of the head-mountable computing device may be on in the first state and off in the second state. As another example, more components of the head-mountable computing device may be on in the first state than in the second state. As yet another example, the head-mountable computing device may sense inputs on a touchpad in the first state and not in the second state. As still another example, the head-mountable computing device may output audio, visual, and/or haptic notifications (e.g., of incoming communications) in the first state and not in the second state. Other examples are possible as well.

The method 100 may be carried out in response to a trigger, periodically, or continuously. The trigger may be, for example, movement of the head-mountable computing device (e.g., as sensed by a movement sensor in the head-mountable computing device) or a time-out, in which a predetermined amount of time passes without input from a user. Other triggers are possible as well.

In some embodiments, after determining that the head-mountable computing device is doffed, the head-mountable computing device may receive data from the at least one capacitive sensor indicating an input. The input may be, for example, an input movement, such as an input movement across the at least one capacitive sensor by a finger of a user, an input movement across the at least one capacitive sensor and back by a finger of a user, or a movement to cover the at least one capacitive sensor with a finger of a user for a period of time. In embodiments where two or more capacitive sensors are used, the input movement may be across some or all of the capacitive sensors. Other inputs are possible as well.

In some embodiments, the input may indicate a rate of change of capacitance, as described above. In these embodiments, the head-mountable computing device may, for example, compare the rate of change of capacitance with an input threshold rate of change of capacitance, which may differ from the threshold rate of change of capacitance described above. Based on the comparison, the head-mountable computing device may determine that the data indicates the input. The data may indicate the input in other manners as well.

In response to receiving the data indicating the input, the head-mountable computing device may cause the head-mountable computing device to operate in a third state in which the head-mountable computing device consumes more power than in the second state and/or less power than in the first state. For example, a display of the head-mountable computing device may be off in the third state. As another example, the head-mountable computing device may output audio but not visual or haptic notifications (e.g., of incoming communications) in the third state. Other examples are possible as well.

While the embodiments above described a comparison between a rate of change of capacitance and a threshold rate of change in capacitance, in other embodiments other comparisons may be made instead.

For example, in some embodiments, a comparison may be made between a change of capacitance and a threshold change of capacitance. The threshold change of capacitance may take a number of forms. For example, the threshold change may be significantly higher than a typical change of capacitance due to environmental changes (e.g., changes in humidity). As another example, the threshold change may be approximately equal to a measured change of capacitance during a period of time during which a user moves the head-mountable computing device from being donned to being doffed, or vice versa, as determined, e.g., during calibration and/or use of the head-mountable computing device. The threshold change of capacitance may take other forms as well. The comparison of the change of capacitance and the threshold change of capacitance may involve, for example, determining whether the change of capacitance is greater than or equal to (e.g., in magnitude) the threshold change of capacitance. The comparison may take other forms as well.

As another example, in some embodiments, a comparison may be made between a sensed capacitance and a reference capacitance. That is, each capacitance sensed by the at least one capacitive sensor may be compared with the reference capacitance. The reference capacitance may take a number of forms. For example, the reference capacitance may be determined based on a capacitance of a head of a user. For instance, the reference capacitance may be an average capacitance of a human head, an average capacitance of a number of users' heads, or a predetermined (e.g., premeasured) capacitance of a particular user's head. As another example, the reference capacitance may be determined based on a capacitance sensed while the head-mountable computing device is donned. For instance, the reference capacitance may be a predetermined (e.g., premeasured) capacitance of a particular user's head when the head-mountable computing device is donned. As still another example, the reference capacitance may be determined based on a capacitance sensed while the head-mountable computing device is doffed. The reference capacitance may be fixed or may be adaptive (e.g., may be modified by the head-mountable computing device over time in response to, for instance, sensed environmental conditions). The reference capacitance may take other forms as well.

Depending on the reference capacitance, the comparison of the sensed capacitance and the reference capacitance may take several forms. For example, in embodiments where the reference capacitance is an average capacitance of a human head or a predetermined capacitance of a particular user's head when the head-mountable computing device is donned, the head-mountable computing device may compare the sensed capacitance and the reference capacitance to determine whether the sensed capacitance is approximately equal to (e.g., within a predetermined threshold of) the reference capacitance. As another example, in embodiments where the reference capacitance is a predetermined capacitance of a particular user's head when the head-mountable computing device is doffed, the head-mountable computing device may compare the sensed capacitance and the reference capacitance to determine whether the sensed capacitance greater than the reference capacitance. The comparison may take other forms as well.

3. Example Head-Mountable Computing Device

Systems and devices in which example embodiments of the above example methods may be implemented will now be described in greater detail. In general, an example system may be implemented in or may take the form of a head-mountable computing device. However, an example system may also be implemented in or take the form of other devices, such as a mobile phone or tablet computer, among others. Further, an example system may include a non-transitory computer-readable medium, which has program instructions stored thereon that are executable by at least one processor to provide the functionality described herein. An example system may also take the form of a subsystem of any of the devices described above that includes such a non-transitory computer-readable medium having such program instructions stored thereon.

Figure 2A:
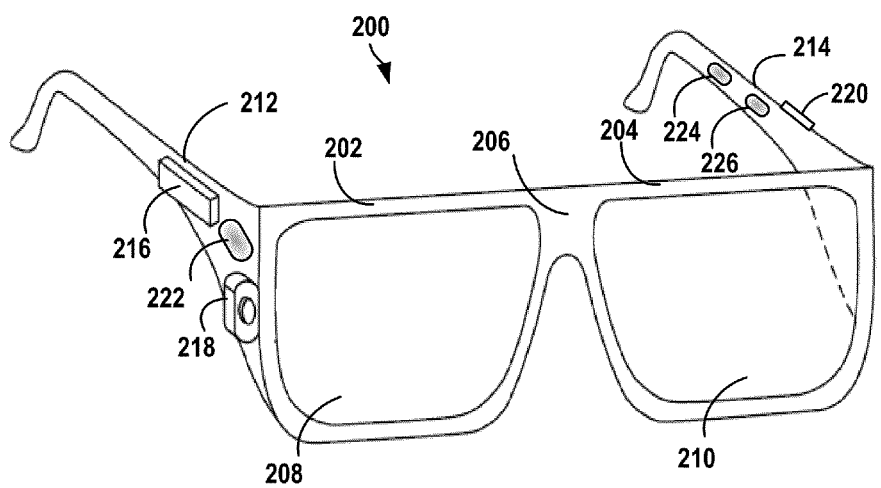

FIGS. 2A-G illustrate head-mountable computing devices, in accordance with example embodiments. In the example of FIG. 2A, a head-mountable computing device 200 comprises frame elements including lens-frames 202, 204 and a center frame support 206, lens elements 208, 210, and extending side-arms 212, 214. The center frame support 206 and the extending side-arms 212, 214 are configured to secure the head-mountable computing device 200 to a user's face via a user's nose and ears, respectively.

Each of the frame elements 202, 204, and 206 and the extending side-arms 212, 214 may be formed of a solid structure of plastic and/or metal, or may be formed of a hollow structure of similar material so as to allow wiring and component interconnects to be internally routed through the head-mountable computing device 200. Other materials may be possible as well.

One or more of each of the lens elements 208, 210 may be formed of any material that can suitably display a projected image or graphic. Each of the lens elements 208, 210 may also be sufficiently transparent to allow a user to see through the lens element. Combining these two features of the lens elements 208, 210 may facilitate an augmented reality or heads-up display where a projected image or graphic is superimposed over a real-world view as perceived by the user through the lens elements. For example, combining these two features of the lens elements 208, 210 may allow the head-mountable computing device 200 to overlay textual and/or graphical information on a scene, as described above.

The extending side-arms 212, 214 may each be projections that extend away from the lens-frames 208, 210, respectively, and may be positioned behind a user's ears to secure the head-mountable computing device 200 to the user. The extending side-arms 212, 214 may further secure the head-mountable computing device 200 to the user by extending around a rear portion of the user's head (not shown). Additionally or alternatively, for example, the head-mountable computing device 200 may connect to or be affixed within a head-mountable helmet structure (not shown). Other possibilities exist as well.

The head-mountable computing device 200 may also include an on-board computing system 216, an image-capture device 218, a motion sensor 220, and a finger-operable touch pad 222. The on-board computing system 216 is shown to be positioned on the extending side-arm 212 of the head-mountable computing device 200. However, the on-board computing system 216 could be provided on other parts of the head-mountable computing device 200 or may be positioned remote from the head-mountable computing device 200 (e.g., the on-board computing system 216 could be wire- or wirelessly-connected to the head-mountable computing device 200). The on-board computing system 216 may include a processor and memory, for example. The on-board computing system 216 may be configured to receive and analyze data from the image-capture device 218 and the finger-operable touch pad 222 (and possibly from other sensory devices, user interfaces, or both) and generate images for output by the lens elements 208 and 210.

The image-capture device 218 is shown positioned on the extending side-arm 212 of the head-mountable computing device 200. However, the image-capture device 218 could be provided on other parts of the head-mountable computing device 200. The image-capture device 218 may be configured to capture still images and/or video images at various resolutions or at different frame rates. Image-capture device 218 could have a small form-factor, such as those used in cell phones or webcams.

Further, although FIG. 2A illustrates one image-capture device 218, head-mountable computing device 200 could include multiple image-capture devices, and each may be configured to capture the same view, or to capture different views. For example, the image-capture device 218 may be forward facing to capture at least a portion of the real-world view perceived by the user. This forward facing image captured by the image-capture device 218 may then be used to generate an augmented reality in which computer generated images appear to interact with the real-world view perceived by the user.

The motion sensor 220 is shown on the extending side-arm 214 of the head-mountable computing device 200. However, the motion sensor 220 could be positioned on other parts of the head-mountable computing device 200. The motion sensor 220 may include one or more of a gyroscope or an accelerometer, for example. Other sensing devices may be included within, or in addition to, the motion sensor 220 or other sensing functions may be performed by the motion sensor 220.

The finger-operable touch pad 222 is shown on the extending side-arm 212 of the head-mountable computing device 200; however, the finger-operable touch pad 422 may be positioned on other parts of the head-mountable computing device 200. Also, more than one finger-operable touch pad may be present on the head-mountable computing device 200. The finger-operable touch pad 222 may be used by a user to input commands. The finger-operable touch pad 222 may sense at least one of a position and a movement of a finger via capacitive sensing, resistance sensing, or a surface acoustic wave process, among other possibilities. The finger-operable touch pad 222 may be capable of sensing finger movement in a direction parallel and/or planar to the pad surface, in a direction normal to the pad surface, or both, and may also be capable of sensing a level of pressure applied to the pad surface. The finger-operable touch pad 222 may be formed of one or more translucent or transparent insulating layers and one or more translucent or transparent conducting layers. Edges of the finger-operable touch pad 222 may be formed to have a raised, indented, or roughened surface, so as to provide tactile feedback to a user when the user's finger reaches the edge, or other area, of the finger-operable touch pad 222. If more than one finger-operable touch pad is present, each finger-operable touch pad may be operated independently, and may provide a different function.

As shown, the head-mountable computing device 200 also includes capacitive sensors 224, 226. The capacitive sensors 224, 226 may be formed of, for example, copper. Other materials are possible as well. The capacitive sensors 224, 226 are shown to be positioned on the extending side-arm 214 of the head-mountable computing device 200; however, the capacitive sensors 224, 226 may be provided on other parts of the head-mountable computing device 200 as well. Further, while two capacitive sensors 224, 226 are shown, more or fewer capacitive sensors 224, 226 are possible as well. Each of the capacitive sensors 224, 226 may be configured to sense a capacitance between the capacitive sensor and a surrounding medium, such as air and/or a nearby conductor, such as a head of a user, as well as a capacitance between the capacitive sensor and a "ground," such as a nonconducting portion of the head-mountable computing device.

Figure 2B:
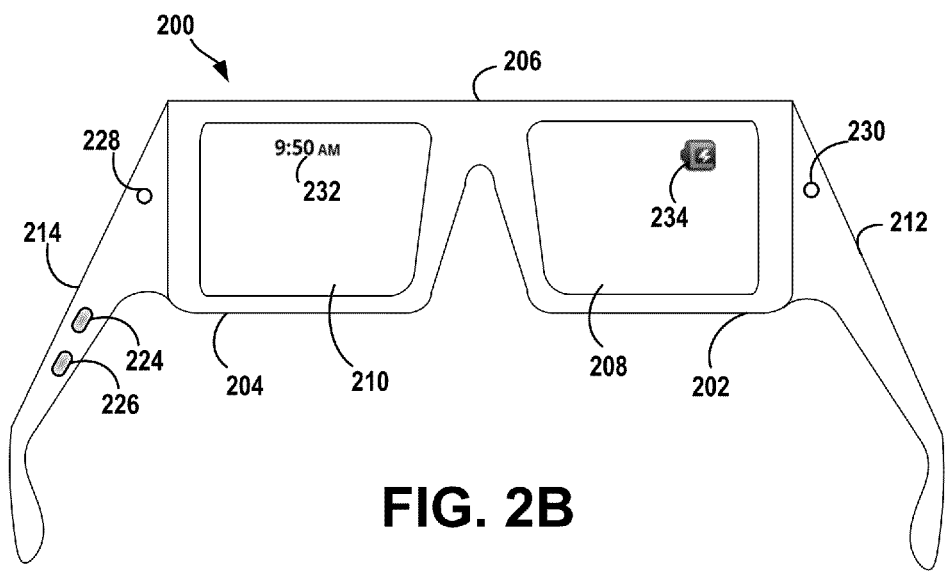

FIG. 2B illustrates an alternate view of the head-mountable computing device 200 illustrated in FIG. 2A, in accordance with an example embodiment. As shown in FIG. 2B, the lens elements 208, 210 may act as display elements. The head-mountable computing device 200 may include a first projector 228 coupled to an inside surface of the extending side-arm 214 and configured to project a display 232 onto an inside surface of the lens element 210. Additionally or alternatively, a second projector 230 may be coupled to an inside surface of the extending side-arm 212 and configured to project a display 234 onto an inside surface of the lens element 208.

The lens elements 208, 210 may act as a combiner in a light projection system and may include a coating that reflects the light projected onto them from the projectors 228, 230. In some embodiments, a reflective coating may not be used (e.g., when the projectors 228, 230 are scanning laser devices).

In alternative embodiments, other types of display elements may also be used. For example, the lens elements 208, 210 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 208, 210 for driving such a matrix display. Alternatively or additionally, a laser or light-emitting diode (LED) source and scanning system could be used to draw a raster display directly onto the retina of one or more of the user's eyes. Other possibilities exist as well.

Figure 2C:
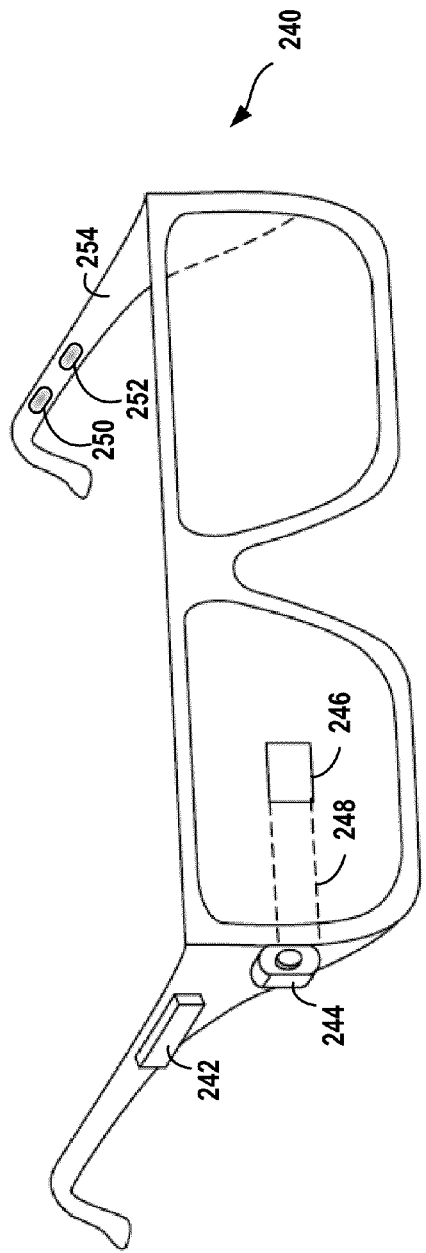

FIG. 2C illustrates a head-mountable computing device 240, in accordance with another example embodiment. The head-mountable computing device 240 may include frame elements and side-arms similar to those described above in connection with FIGS. 2A-B. The head-mountable computing device 240 may additionally include an on-board computing system 242 and an image-capture device 244, which may take any of the forms described above in connection with FIGS. 2A-B. The image-capture device 244 is shown mounted on a frame of the head-mountable computing device 240. However, the image-capture device 244 may be mounted at other positions as well.

As shown in FIG. 2C, the head-mountable computing device 240 may include a single display 246 which may be coupled to the head-mountable computing device 240. The display 246 may be formed on one of the lens elements of the head-mountable computing device 240 and may be configured to overlay computer-generated graphics in the user's view of the physical world. The display 246 is shown to be provided in a center of a lens of the head-mountable computing device 240. However, the display 246 could be provided in other positions as well. The display 246 is controllable via the computing system 242, which may be coupled to the display 246 via an optical waveguide 248, as shown.

As further shown in FIG. 2C, the head-mountable computing device 240 includes two capacitive sensors 250, 252. The capacitive sensors 250, 252 are shown mounted on a sidearm 254 of the head-mountable computing device 240. However, the capacitive sensors 250, 252 may be mounted at other positions as well. Further, while two capacitive sensors 250, 252 are shown, more or fewer capacitive sensors are possible as well. The capacitive sensors 250, 252 may take any of the forms described above in connection with FIGS. 2A-B.

Figure 2D:
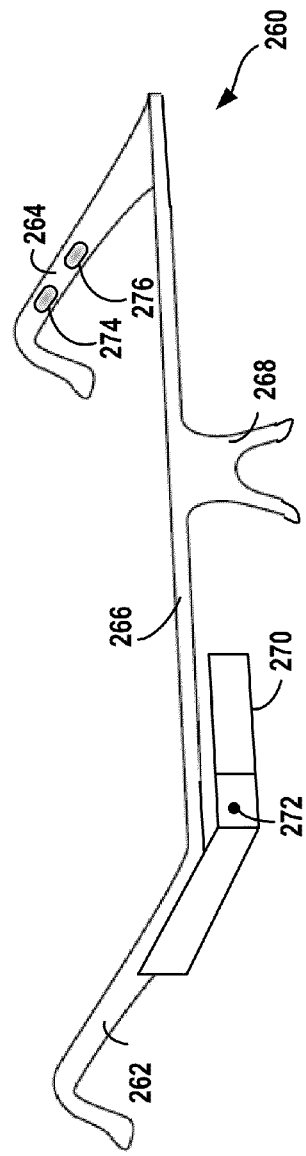

FIG. 2D illustrates a head-mountable computing device 260, in accordance with yet another example embodiment. The head-mountable computing device 260 may include side-arms 262, 264 and a center frame support 266, which may take any of the forms described above in connection with FIGS. 2A-B. Further, the head-mountable computing device 260 may include a bridge portion with nosepiece 268. The head-mountable computing device 260 may additionally include an on-board computing system and an image-capture device (not shown), which may take any of the forms described above in connection with FIGS. 2A-B.

As shown in FIG. 2D, the center frame support 266 connects the side-arms 262, 264. In contrast to those shown in FIGS. 2A-C, the head-mountable computing device 260 shown in FIG. 2D does not include lens-frames containing lens elements. Rather, as shown, the head-mountable computing device 260 includes a single lens element 270 that may be coupled to one of the side-arms 262 and/or the center frame support 266. The single lens element 270 may include a display and may be configured to overlay computer-generated graphics upon the user's view of the physical world. The display may be controllable via the computing system, which may be coupled to the display via an optical waveguide 272, as shown.

In one example, the single lens element 270 may be coupled to an inner side (i.e., a side exposed to a portion of a user's head when worn by the user) of the extending side-arm 262. The single lens element 270 may be positioned in front of or proximate to a user's eye when the head-mountable computing device 260 is worn by a user. For example, the single lens element 270 may be positioned below the center frame support 266, as shown in FIG. 2D.

As further shown in FIG. 2D, the head-mountable computing device 260 may include two capacitive sensors 274, 276. The capacitive sensors 274, 276 are shown mounted on a sidearm 264 of the head-mountable computing device 260. However, the capacitive sensors 274, 276 may be mounted at other positions as well. Further, while two capacitive sensors 274, 276 are shown, more or fewer capacitive sensors are possible as well. The capacitive sensors 274, 276 may take any of the forms described above in connection with FIGS. 2A-B.

FIG. 2E illustrates a head-mountable computing device 280, in accordance with yet another example embodiment. As shown in FIG. 2E, the head-mountable computing device 280 includes a capacitive sensor 282 on one sidearm of the head-mountable computing device and another capacitive sensor 284 on another sidearm of the head-mountable computing device. Placing the capacitive sensors 282, 284 on opposite sidearms may improve an ability of the head-mountable computing device to reject false positives and/or negatives when making comparisons between a sensed capacitance and a reference capacitance, as described above. While each of the capacitive sensors 282, 284 is shown to extend across most of the sidearm, in other embodiments the capacitive sensors 282, 284 may extend across more of less of the sidearms.

FIG. 2F illustrates a head-mountable computing device 286, in accordance with yet another example embodiment. As shown in FIG. 2F, the head-mountable computing device 286 includes a capacitive sensor 288. The capacitive sensor 288 is shown to extend across a frame element of the head-mountable computing device 286. While the capacitive sensor 288 is shown to extend across most of the frame element, in other embodiments the capacitive sensor 288 may extend across more of less of the frame element. Further, in some embodiments, two or more capacitive sensors may be used, such as one capacitive sensor extending along the frame element above each lens element. Other examples are possible as well.

FIG. 2G illustrates a head-mountable computing device 290, in accordance with yet another example embodiment. As shown in FIG. 2G, the head-mountable computing device 290 includes a capacitive sensor 292. The capacitive sensor 292 is shown to extend across sidearms and a frame element of the head-mountable computing device 292. While the capacitive sensor 292 is shown to extend across most of the sidearms and the frame element, in other embodiments the capacitive sensor 292 may extend across more of less of the sidearms and/or frame element. Further, in some embodiments, two or more capacitive sensors may be used, such as one capacitive sensor extending along each sidearm. Other examples are possible as well.

The head-mountable computing device may take other forms as well.

Figure 3:
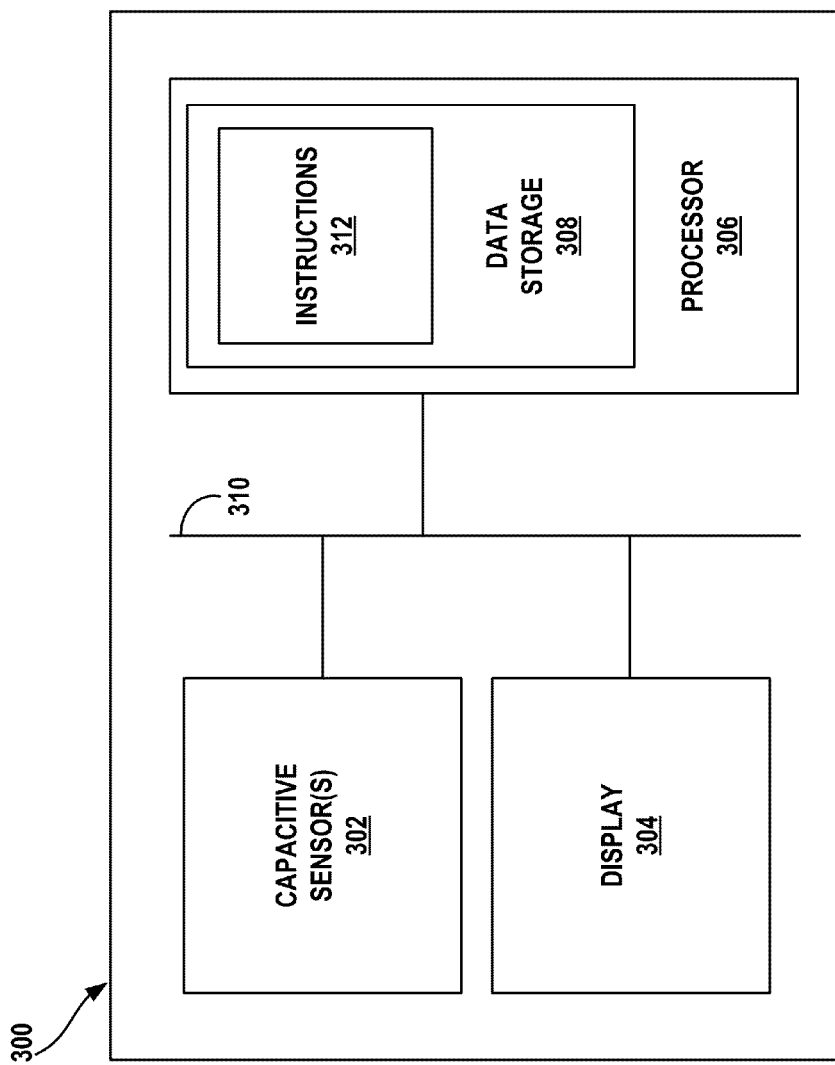
FIG. 3 is a simplified block diagram of a head-mountable computing device, in accordance with example embodiments.

FIG. 3 is a simplified block diagram of a head-mountable computing device 300, in accordance with an example embodiment. As shown, the head-mountable computing device 300 includes one or more capacitive sensors 302, a display 304, a processor 306, and data storage 308, all of which may be communicatively linked together by a system bus, network, and/or other connection mechanism 310.

The capacitive sensor(s) 302 may be any sensor configured to sense a capacitance of a surrounding medium, such as air and/or a nearby conductor, such as a head of a user. The capacitive sensor(s) 302 may take any of the forms described above in connection with the capacitive sensors shown FIG. 2A-G.

The display 304 may be any display configured to display information received from the processor 306 and/or one or more additional sources, such as a video camera or other image-capture device (not shown). To this end, the display 304 may be, for example, a heads-up display, a head-mountable display, an optical see-through display, an optical see-around display, a video see-through display, a flat-panel display, a light-emitting diode (LED) display, an electroluminescent display (ELD), a liquid crystal display (LCD), an organic LED (OLED) display, or any other type of display now known or later developed. The display 304 may alternatively or additionally take any of the forms described above in connection with FIGS. 2A-G.

The processor 306 may comprise one or more general-purpose processors and/or one or more special-purpose processors. To the extent the processor 306 includes more than one processor, such processors could work separately or in combination.

Data storage 308, in turn, may comprise one or more volatile and/or one or more non-volatile storage components, such as optical, magnetic, and/or organic storage, and data storage 308 may be integrated in whole or in part with the processor 306. In some embodiments, data storage 308 may contain instructions 312 (e.g., program logic) executable by the processor 306 to execute various head-mountable computing device functions, including those described above in connection with FIG. 1. Data storage 308 may contain additional instructions as well.

The head-mountable computing device 300 may include one or more elements in addition to or instead of those shown. For example, the head-mountable computing device 300 may include a movement sensor, which may be any sensor configured to sense movement of the head-mountable computing device 300, such as a gyroscope or an accelerometer, for example. Other movement sensors are possible as well. As another example, the head-mountable computing device 300 may include an image-capture device, such as a still camera or a video camera, for example. As yet another example, the head-mountable computing device 300 may include one or more interfaces (e.g., an antenna and a chipset) configured to interact with one or more servers and/or devices. The head-mountable computing device 300 may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. As still another example, the head-mountable computing device 300 may include one or more power supplies. Other additional components are possible as well. In these embodiments, data storage 308 may further include instructions executable by the processor(s) to control and/or communicate with the additional components.

4. Example Use Scenarios

Figure 4A:
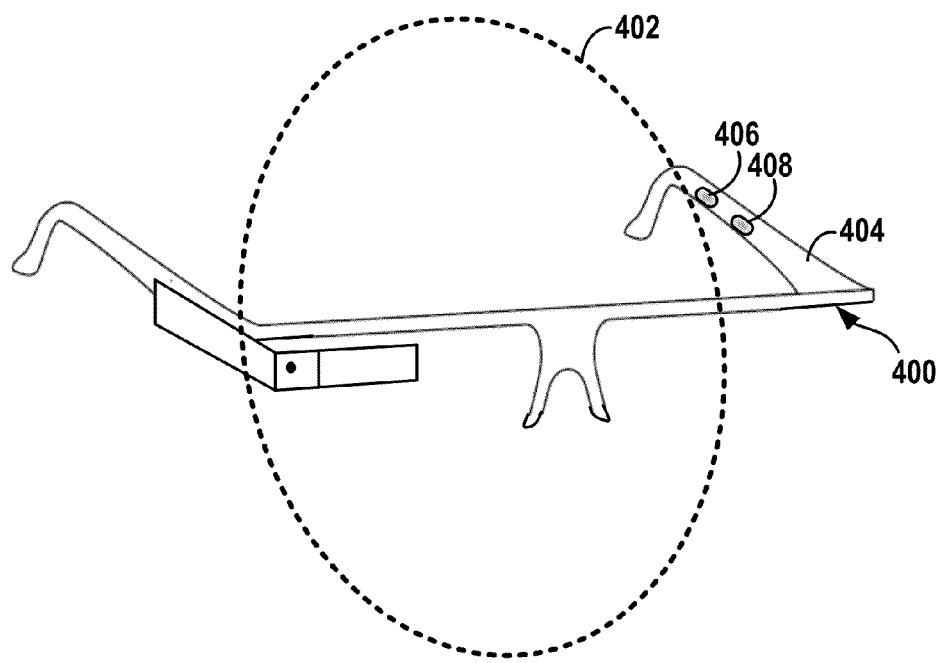
FIGS. 4A-C illustrate use scenarios of a head-mountable computing device with two capacitive sensors, in accordance with an example embodiment.
Figure 4B:
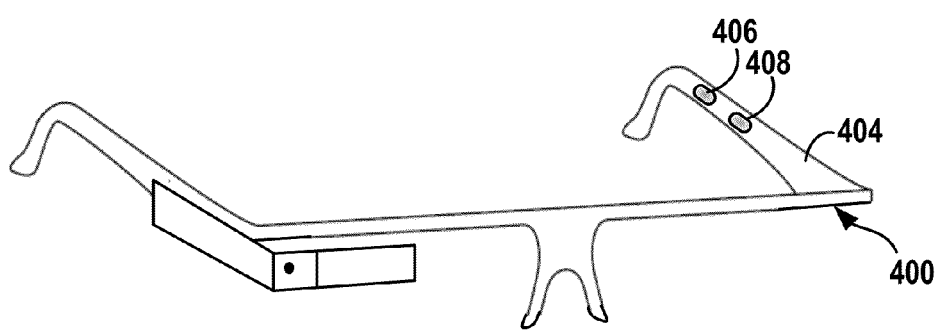
Figure 4C:
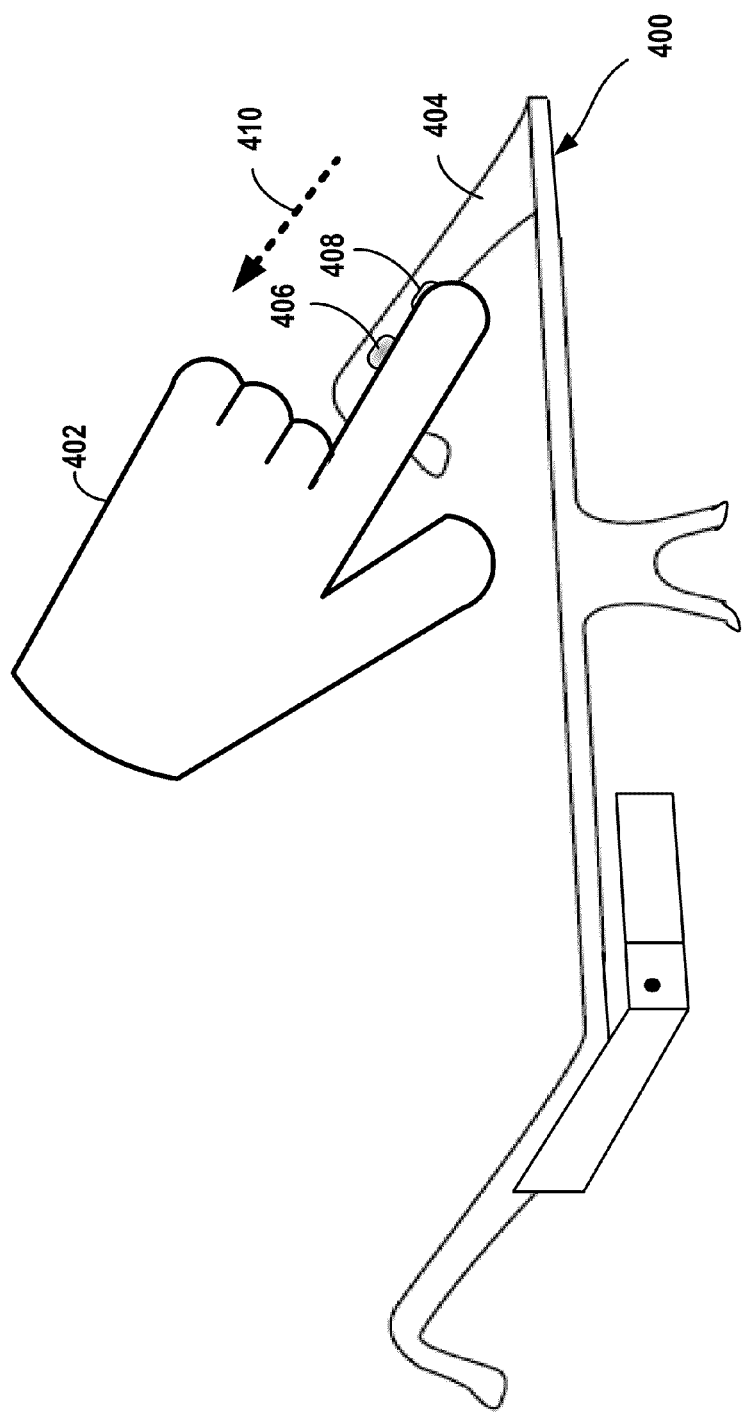

FIGS. 4A-C illustrate scenarios for using a head-mountable computing device 400 with two capacitive sensors 406, 408, in accordance with example embodiments. As shown in FIG. 4A, the head-mountable computing device 400 includes two capacitive sensors 406, 408 positioned on a sidearm 404 of the head-mountable computing device 400. In particular, the two capacitive sensors 406, 408 are positioned on an interior surface of the sidearm 404.

The head-mountable computing device 400 may be donned by a user 402, as shown in FIG. 4A. When the head-mountable computing device 400 is donned by the user 402, the two capacitive sensors 406, 408 are located between the head-mountable computing device 400 and a head of the user 402. As a result, when the head-mountable computing device 400 is donned, each of the two capacitive sensors 406, 408 will sense a capacitance between the capacitive sensor and the head of the user 402.

While the head-mountable computing device 400 is donned, the head-mountable computing device 400 may operate in a first state in which, for example, the head-mountable computing device 400 displays information on a display and outputs visual, audio, and haptic notifications (e.g., of incoming communications).

Thereafter, the head-mountable computing device 400 may be doffed, as shown in FIG. 4B. When the head-mountable computing device 400 is doffed, the two capacitive sensors 406, 408 are located between the head-mountable computing device 400 and air. As a result, when the head-mountable computing device 400 is doffed, the two capacitive sensors 406, 408 will sense a capacitance between each of the two capacitive sensors 406, 408 and the air.

Thus, before the head-mountable computing device 400 is doffed, the head-mountable computing device 400 may sense a capacitance between each of the capacitive sensors 406, 408 and the head of the user 402 and, after the head-mountable computing device 400 is doffed, the head-mountable computing device 400 may sense a capacitance between each of the two capacitive sensors 406, 408 and the air, resulting in a change of capacitance over the period of time during which the head-mountable computing device 400 is being doffed. The head-mountable computing device may determine a rate of change of capacitance to be given by a difference between the capacitance before the head-mountable computing device 400 was doffed and the capacitance after the head-mountable computing device 400 was doffed, divided by a length of time during which the head-mountable computing device was doffed.

The head-mountable computing device 400 may then make a comparison of the rate of change of capacitance and reference threshold rate of change of capacitance. Based on the comparison, the head-mountable computing device 400 may determine that the rate of change of capacitance is greater than the threshold rate of change of capacitance. Additionally, the head-mountable computing device may determine that the capacitance is decreasing. Accordingly, the head-mountable computing device 400 may determine that the head-mountable computing device 400 is being doffed.

In response to determining that the head-mountable computing device 400 is doffed, the head-mountable computing device 400 may operate in a second state in which, for example, the head-mountable computing device 400 powers off the display and ceases to output notifications (e.g., of incoming communications). By powering off the display and ceasing to output notifications, the head-mountable computing device 400 may consume less power in the second state than in the first state.

In some cases, the user 402 may wish to make use of the head-mountable computing device 400 without donning it. For example, the user 402 may wish to communicate with another device. To this end, the user 402 may provide an input to the doffed head-mountable computing device 400.

As shown in FIG. 4C, the user 402 makes an input movement 410 across the two capacitive sensors 406, 408. The two capacitive sensors 406, 408 may sense a rate of change of capacitance that corresponds to the input movement 410. The head-mountable computing device 400 may compare the rate of change of capacitance to an input threshold rate of change of capacitance, which may be different than the threshold rate of change described above. Based on the comparison, the head-mountable computing device 400 may determine that the data indicates the input movement 410.

In response to detecting the input movement 410, the head-mountable computing device 400 may operate in a third state in which, for example, the head-mountable computing device 400 does not display information on the display but does output audible notifications (e.g., of incoming communications). Thus, the user 402 may use the head-mountable computing device 400 to communicate with other devices without donning the head-mountable computing device 400.

By powering off the display, the head-mountable computing device 400 may consume less power in the third state than in the first state. Additionally, though, by outputting audible notifications the head-mountable computing device 400 may consume more power in the third state than in the second state.

It will be understood that the example implementation described above is merely illustrative and is not meant to be limiting. In particular, head-mountable devices, capacitive sensors, threshold rates of change of capacitance, input movements, and states other than those described above are possible as well.

5. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
   receiving, by a head-mountable computing device, data from at least one capacitive sensor indicating a rate of change of capacitance, wherein the at least one capacitive sensor is arranged on the head-mountable computing device so as to detect contact or proximity to an inner surface of a frame of the head-mountable computing device;
   making, by the head-mountable computing device, a comparison of the rate of change of capacitance and a threshold rate of change of capacitance;
   based on the comparison, determining, by the head-mountable computing device, whether the head-mountable computing device is donned or doffed;
   if the head-mountable computing device is donned, causing the head-mountable computing device to operate in a first state;
   if the head-mountable computing device is doffed, causing the head-mountable computing device to operate in a second state, wherein the head-mountable computing device consumes less power in the second state than in the first state; and
   during operation of the head-mountable computing device in the second state:
   (a) detecting, by the head-mountable computing device, input data from the at least one capacitive sensor that corresponds to an input movement on the inner surface; and
   (b) in response to receipt of the input data corresponding to the input movement, causing the head-mountable computing device to operate in a third state, wherein the head-mountable computing device consumes less power in the second state than in the third state.

2. The method of claim 1, wherein the threshold rate of change of capacitance is greater than a typical rate of change of capacitance due to changes in environmental conditions.

3. The method of claim 1, wherein the threshold rate of change of capacitance is determined based on a measured rate of change of capacitance measured while the head-mountable computing device moved from being donned to being doffed or moved from being doffed to being donned.

4. The method of claim 1, wherein:
   the head-mountable computing device being donned comprises the head-mountable computing device being proximate to a head of a user; and
   the head-mountable computing device being doffed comprises the head-mountable computing device not being proximate to a head of a user.

5. The method of claim 1, wherein a display of the head-mountable computing device is on in the first state and off in the second state.

6. The method of claim 1, wherein determining whether the head-mountable computing device is donned or doffed comprises:
   based on the data, determining whether the capacitance is increasing or decreasing;
   if the rate of change in capacitance is greater than the threshold rate of change in capacitance and if the capacitance is increasing, determining that the head-mountable computing device is donned; and
   if the rate of change in capacitance is greater than the threshold rate of change in capacitance and if the capacitance is decreasing, determining that the head-mountable computing device is doffed.

7. A method comprising:
   receiving, by a computing device, data from at least one capacitive sensor indicating a change of capacitance, wherein the at least one capacitive sensor is arranged on a head-mountable computing device so as to detect contact or proximity to an inner surface of a frame of the head-mountable computing device;
   making, by the computing device, a comparison of the change of capacitance and a threshold change of capacitance;
   based on the comparison, determining, by the computing device, whether the head-mountable computing device is donned or doffed;
   if the head-mountable computing device is donned, causing the head-mountable computing device to operate in a first state;
   if the head-mountable computing device is doffed, causing the head-mountable computing device to operate in a second state, wherein the head-mountable computing device consumes less power in the second state than in the first state; and
   during operation of the head-mountable computing device in the second state:
   (a) receiving, by the computing device, second data from the at least one capacitive sensor, wherein the second data corresponds to an input movement on the inner surface; and (b) in response to receipt of the second data corresponding to the input movement, causing the head-mountable computing device to operate in a third state, wherein the head-mountable computing device consumes less power in the second state than in the third state.

8. The method of claim 7, wherein the threshold change of capacitance is greater than a typical change of capacitance due to changes in environmental conditions.

9. The method of claim 7, wherein the threshold change of capacitance is determined based on a measured change of capacitance measured while the head-mountable computing device moved from being donned to being doffed or moved from being doffed to being donned.

10. The method of claim 7, wherein a display of the head-mountable computing device is on in the first state and off in the second state.

11. The method of claim 7, wherein determining whether the head-mountable computing device is donned or doffed comprises:
   based on the data, determining whether the capacitance is increasing or decreasing;
   if the change in capacitance is greater than the threshold change in capacitance and if the capacitance is increasing, determining that the head-mountable computing device is donned; and
   if the change in capacitance is greater than the threshold change in capacitance and if the capacitance is decreasing, determining that the head-mountable computing device is doffed.

12. A head-mountable computing device comprising:
   at least one capacitive sensor operable to detect contact or proximity to an inner surface of a frame of the head-mountable computing device;
   at least one processor; and
   data storage comprising instructions executable by the at least one processor to:
      receive from the at least one capacitive sensor data indicating a rate of change of capacitance;
      make a comparison of the rate of change of capacitance and a threshold rate of change of capacitance;
      based on the comparison, determine whether the head-mountable computing device is donned or doffed;
      if the head-mountable computing device is donned, cause the head-mountable computing device to operate in a first state;
      if the head-mountable computing device is doffed, cause the head-mountable computing device to operate in a second state, wherein the head-mountable computing device consumes less power in the second state than in the first state; and
      during operation of the head-mountable computing device in the second state:
         (a) detect input data from the at least one capacitive sensor that corresponds to an input movement on the inner surface; and
         (b) in response to receipt of the input data corresponding to the input movement, cause the head-mountable computing device to operate in a third state, wherein the head-mountable computing device consumes less power in the second state than in the third state.

13. The head-mountable computing device of claim 12, wherein the at least one capacitive sensor comprises two capacitive sensors.

14. The head-mountable computing device of claim 12, wherein:
   the head-mountable computing device comprises a sidearm; and
   the at least one capacitive sensor is positioned on the sidearm.

15. The head-mountable computing device of claim 12, wherein:
   the head-mountable computing device comprises a first sidearm and a second sidearm;
   the at least one capacitive sensor comprises a first capacitive sensor and a second capacitive sensor;
   the first capacitive sensor is positioned on the first sidearm; and
   the second capacitive sensor is positioned on the second sidearm.

16. The head-mountable computing device of claim 12, further comprising a display.

17. The head-mountable computing device of claim 16, wherein the display is on in the first state and off in the second state.

18. The head-mountable computing device of claim 12, wherein:
   the head-mountable computing device being donned comprises the head-mountable computing device being proximate to a head of a user; and
   the head-mountable computing device being doffed comprises the head-mountable computing device not being proximate to a head of a user.

19. The head-mountable computing device of claim 12, wherein:
   the head-mountable computing device consumes more power in the third state than in the second state; and
   the head-mountable computing device consumes less power in the third state than in the first state.

* * * * *